United States Patent [19]

Ohmori

[11] Patent Number: 4,869,131

[45] Date of Patent: Sep. 26, 1989

[54] VARIABLE SPEED GEARING IN ROTARY ELECTRIC TOOL

[75] Inventor: Toshitaka Ohmori, Saitama, Japan

[73] Assignee: Olympic Co., Ltd., Iruma, Japan

[21] Appl. No.: 154,027

[22] Filed: Feb. 9, 1988

[30] Foreign Application Priority Data

Mar. 9, 1987 [JP] Japan .................. 62-54474

[51] Int. Cl.$^4$ .............................................. F16H 3/62
[52] U.S. Cl. .................................. 74/750 R; 74/768;
81/467; 173/12
[58] Field of Search ............... 74/750 R, 714, 768;
81/467, 473, 476; 408/139, 133, 124; 173/12, 11

[56] References Cited

U.S. PATENT DOCUMENTS

| 2,777,346 | 1/1957 | Brame | 81/476 |
|---|---|---|---|
| 3,319,494 | 5/1967 | Ulbing | 81/476 X |
| 3,430,521 | 3/1969 | Kalman | 74/750 R |
| 3,472,081 | 10/1969 | Keller et al. | 74/750 R |
| 3,513,724 | 5/1970 | Box | 74/750 R |
| 3,858,444 | 1/1975 | Wallace | 173/12 X |
| 4,147,219 | 4/1979 | Wallace | 173/12 |
| 4,462,282 | 7/1984 | Biek | 408/124 X |
| 4,513,827 | 4/1985 | Dubiel | 173/12 |
| 4,554,980 | 11/1985 | Doniwa | 173/12 |

FOREIGN PATENT DOCUMENTS 59-15764  4/1984  Japan .

Primary Examiner—Dwight G. Diehl
Attorney, Agent, or Firm—Sandler & Greenblum

[57] ABSTRACT

A differential gear mechanism is mounted within a gear case fixed to a housing, an intermediate gear and a clutch mechanism are disposed on at least one output side, and a rotation changes for changing over the rotation of both output shafts between synchronous rotation and independent rotation according to increase or decrease in load relative to a present torque value.

7 Claims, 3 Drawing Sheets

VARIABLE SPEED GEARING IN ROTARY ELECTRIC TOOL

BACKGROUND OF THE INVENTION

1. Field of the Invention

The present invention relates to a variable speed gearing in a rotary electric tool such as a motor-driven screw-driver or drill.

2. Discussion of Background Information and Prior Art

In conventional motor-driven screw-drivers and drills, the number of revolutions of a terminal output shaft is generally varied high and low by changing the combination in the number of teeth of spur gears. An example is as disclosed in Japanese Patent Publication No. 15764/1984. In such conventional device, however, the change of speed is performed manually using a speed changing handle, so there is inconvenience, which is inconvenient because the operation for change-over must be done during rotation.

More particularly, when the load exerted on the tool in use becomes large and the rotation stops, the speed is changed to low by operating the speed changing handle to increase the tightening torque. The degree of rotation of the tool is checked visually or by the hands which hold the tool, and the speed is changed manually according to the thus-confirmed condition.

SUMMARY OF THE INVENTION

The present invention has been developed in view of the conventional circumstances mentioned above and it is the object of the present invention to eliminate the inconvenience to the user required in order to sense an increase or decrease of the load exerted on the rotating tool and then change the speed according to the observed situation.

The technical means for overcoming the above problem in accordance with the present invention is characterized in that a differential gear mechanism is mounted within a gear case which is fixed to a housing, for example, an intermediate gear and a clutch mechanism are disposed on at least one output side, in order to attain the same rotating direction of both inner and outer output shafts of the differential gear mechanism, and a change-over means for changing over the rotation of both output shafts between synchronous rotation and independent rotation according to increase or decrease in load relative to a preset torque value is operably connected there between.

The gear case and an internal gear in the differential gear mechanism may be engaged with or disengaged from each other by any of the following methods: (i) a method in which such engagement and disengagement are effected by axial movement of a torque setting cam having unevenness; (ii) a method in which the member for effecting such engaging and disengaging operations is operated electrically using a limit switch; and a method in which motor load current and voltage are detected for the same purpose.

According to the present invention as described above, when the load is small within the preset torque range, only the inner output shaft out of the two, inner and outer output shafts of the differential gear mechanism operates and it rotates at high speed, when the load increases during that rotation, the change-over means functions to operate and synchronize the two, inner and outer output paths so that decelerated rotation is transmitted to the driving output shaft.

DESCRIPTION OF A PREFERRED EMBODIMENT

Figure 1:
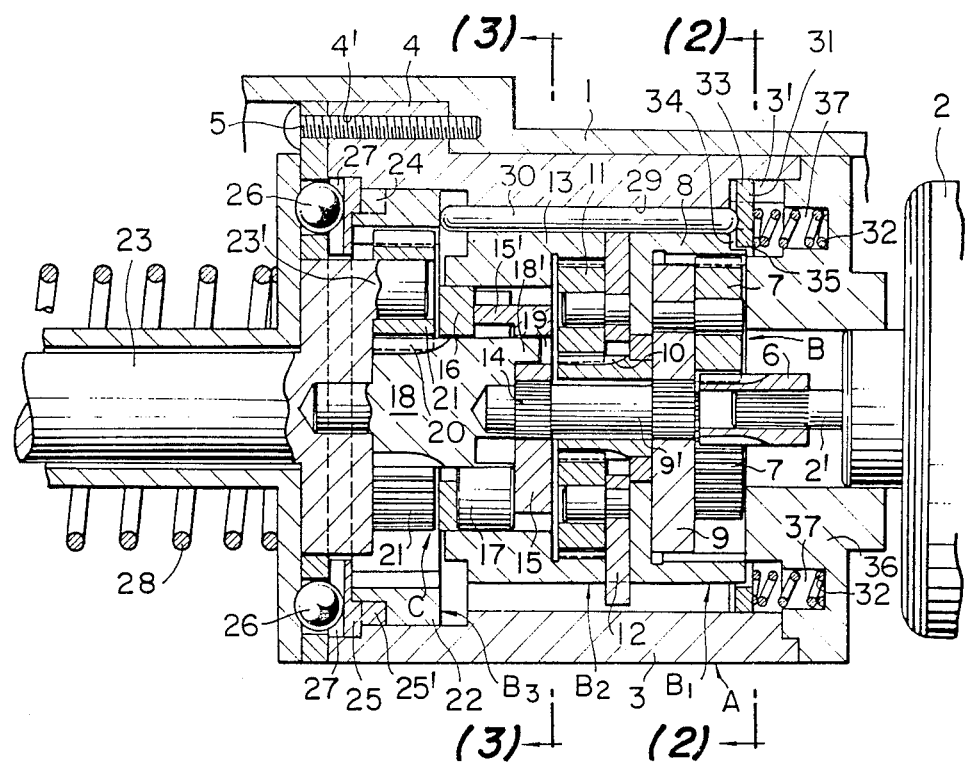
FIG. 1 is a sectional view of a variable speed gearing according to an embodiment of the present invention, which is in a rotating condition at high speed.
Figure 2:
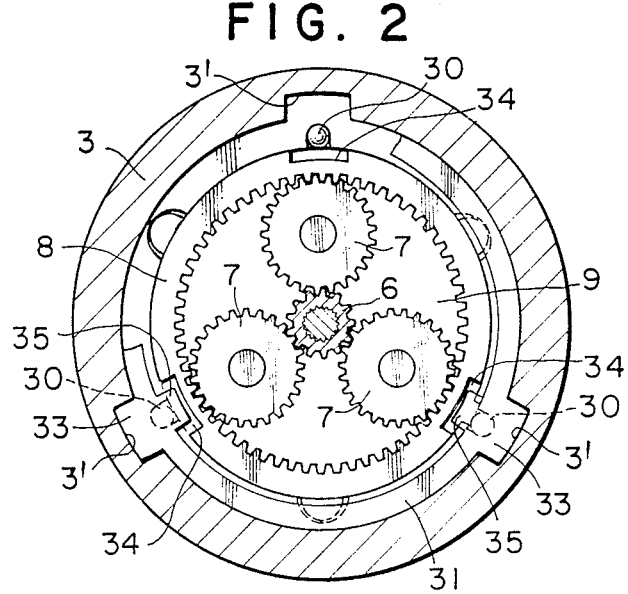
FIG. 2 is a sectional view taken along line (2)—(2) of FIG. 1.

A variable speed gearing including a change-over means which utilizes a torque setting cam, according to an embodiment of the present invention, will be described hereinunder with reference to the accompanying drawings.

Numeral 1 denotes a housing of a motor-driven drill or screw driver. In front of a motor 2 mounted fixedly in the housing 1 is provided a variable speed gearing A for changing the number of revolutions. The variable speed gearing A is composed of a gear case 3 and a differential gear mechanism B mounted within the case 3. The gear case 3 is in the form of a cylinder having open ends. The outer peripheral surface thereof is formed with plural mounting lugs 4 each having a machine screw insertion holes 4', and the gear case 3 is fixed to the housing 1 with machine screws 5 through the insertion holes 4'.

The differential gear mechanism B mounted inside the gear case 3 is composed of three stages of planetary gear mechanisms $B_1$, $B_2$ and $B_3$. Planetary gears 7 in the first-stage planetary gear mechanism $B_1$ are in mesh with a pinion 6 which is fixed onto a rotative shaft 2' of the motor 2, whereby the rotation of the motor is input to the differential gear mechanism B.

The first planetary gear mechanism $B_1$ is composed of three planetary gears 7, an internal gear 8 meshing with the planetary gears 7, and a support plate 9 which supports the planetary gears 7. A shaft 9' is fixed integrally to the center of the support plate 9 to support not only a cylindrical shaft portion 8' of the internal gear 8 but also the second planetary gear mechanism $B_2$.

The second planetary gear mechanism $B_2$ is composed of four planetary gears 11 which are in mesh with a sun gear 10 formed on the outer peripheral surface of the cylindrical shaft portion 9' of the internal gear 8 in the first planetary gear mechanism $B_1$, a support plate 12 which supports the planetary gears 11, and an internal gear 13 meshing with the planetary gears 11. Inside the internal gear 13 is disposed a clutch mechanism C which transmits the rotation to the third planetary gear mechanism $B_3$.

The change over mechanism C comprises a change-over cam 15 engaged with a toothed portion 14 of the shaft 9' in the first planetary gear mechanism $B_1$, a retainer 16 fitted inside the internal gear 13, lugs 15' of the change-over cam 15, rollers 17 fitted in recesses 16' of the retainer 16, and a change-over shaft 18 fitted in a hole of the retainer 16 and adapted to be engaged with and disengaged from the peripheral surface of the rollers 17, the change-over shaft 18 having a section which is shown in FIG. 18 as being generally in the shape of a triangular shaped cam with corners rounded to give the appearance of what can be called a rice ball. The change-over shaft 15 is formed with arcuate groves 19 at an angle of 60° in trisected positions of the circumference, and pawls 18' projecting from a side end face of the change-over shaft 18 are fitted in and engaged with the arcuate grooves 19, so that the shaft 18 rotates in interlock with the rotation of the change-over cam 15. The projecting pawls 18' are set at an angle (40°) smaller than that of the arcuate grooves 19 so that there occurs discrepancy in operation between the two.

The third planetary gear mechanism $B_3$, which is operated by a sun gear 20 formed on the outer peripheral surface of the front portion of the change-over shaft 18 in the clutch mechanism C, is composed of three planetary gears 21 meshing with the sun gear 20, an internal gear 22 meshing with the planetary gears 21, and a driving output shaft 23 integral with a support plate 23' which supports the planetary gears 21. On the outer peripheral surface of the internal gear 22 are formed projections 24 of a trapezoidal section at equal intervals in the circumferential direction, and a torque setting cam 25 having projections 25' adapted to be engaged with and disengaged from the projections 24 is fitted in the front portion of the gear case 3. Further, recesses 27 for fitting therein of balls 26 are formed in the face of the torque setting cam 25 on the side opposite to the side where the projections 25' are formed. The force of a spring 28, whose biasing force is varied by turning of a torque adjusting knob (not shown), is exerted on the torque setting cam 25 through the balls 26. More specifically, within the range of a torque which has been set by turning the torque adjusting knob, the planetary gears 21 and the torque setting cam 25 are engaged with each other to prevent the rotation of the planetary gears 21, while when a load exceeding the preset torque is imposed on the driving output shaft 23, the internal gear 22 meshing with the planetary gears 21 rotates and is pushed out backward (rightward in the drawing) beyond the projections 25' of the torque setting cam 25.

The axial movement of the internal gear 22 which operates upon detection of an increase or decrease of the load relative to the preset torque causes backward movement of slide pins 30 fitted in slots 29 formed inside the gear case 3, whereby the gear case 3 and the internal gear 8 in the first planetary gear mechanism $B_1$ are engaged and connected with each other to push a change-over disk 31 which has stopped the rotation of the internal gear 8 backward against the biasing force of a spring 32 until it becomes disengaged from the internal gear 8, thereby permitting rotation of the internal gear 8.

The change-over disk 31, which is a doughnut-like disk, is provided outside with engaging lugs 33 fitted in and engaged with retaining recesses 3' of the gear case 3, and also provided inside with retaining lugs 35 fitted in and engaged with notches 34 of the internal gear 8.

Further, springs 32 for urging the change-over disk 31 in the direction of engagement with the gear case 3 and the internal gear 8 are mounted within mounting holes 37 formed in the front face of a motor base 36.

The operation of the above variable speed gearing will now be explained. In a load condition smaller than the preset torque value, the rotation of the rotative shaft 2' of the motor 2 is transmitted as follows: pinion 6 (forward rotation)→planetary gears 7 (reverse rotation)→support plate 9 (shaft 9')(forward rotation)→change-over cam 15→change-over shaft 18 (sun gear 20)→planetary gears 21 support plate 23'→driving output shaft 23, whereby a drill or a screw tightening tool connected to the driving output shaft is rotated. There is performed a so-called high speed rotation.

During the above high speed rotation, when the load on the tool increases to a level exceeding the preset torque at the final screwing stage, the rotation of the driving output shaft 23 connected with the tool decreases, while the planetary gears 21 continue to rotate in their normal positions, so that the internal gear 22 meshing with the planetary gears 21 is rotated and moves in the axial direction (rightward in the drawing) to get over the projections 25' of the torque setting cam 25, whereby the slide pins 30 are forced out backward to push the change-over disk 31 backward against the biasing force of the springs 32 and disengage it from the internal gear 8. As a result, the rotation of the rotative shaft 2' of the motor 2 is transmitted as follows:

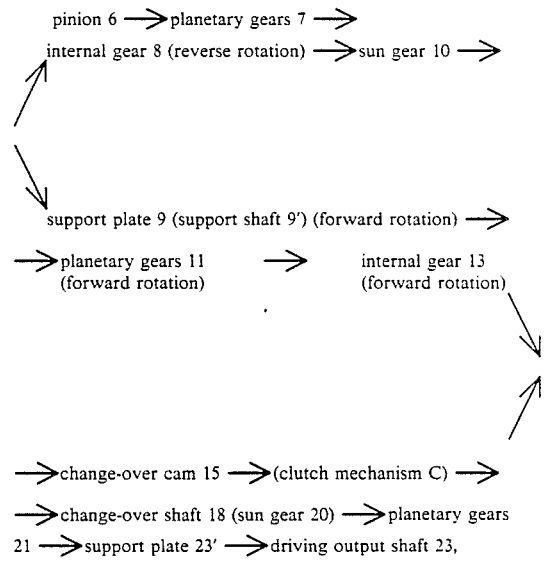

→change-over cam 15 →(clutch mechanism C) →

→change-over shaft 18 (sun gear 20) →planetary gears 21 →support plate 23' →driving output shaft 23, whereby the rotation of the driving output shaft is decelerated and the torque increases. At this time, the second planetary gear mechanism $B_2$ functions to cause the first-stage iternal gear 8 to return from reverse to forward rotation and at the same time decelerate it. As a result of rotation of the internal gear 13 in the second planetary gear 13, the retainer 16 which holds the rollers 17 is also rotated in the same direction by virtue of friction, so that the rollers 17 are stuck wedgewise between the internal gear 13 and the change-over shaft 18 to make the gear 13 and the shaft 18 integral with each other.

Further, although the change-over disk 31 is engaged with and disengaged from the internal gear 8 of the first planetary gear mechanism $B_1$ by automatic change-over operation using a cam according to increase or decrease of the load exerted on the terminal output portion, optional selection may be made between the state in which the change-over plate is kept retained from the exterior and the state in which it is forcibly kept disengaged.

Since the variable speed gearing of the present invention is constructed as above, the inner and outer output systems of the differential gear mechanism rotate synchronously or each independently according to increase or decrease of the load imposed on the terminal output portion, resulting in that the rotation of the terminal output portion is changed over between high and low speed rotational conditions.

Thus, it is not necessary at all for the user to check the degree of the load exerted on the output portion and perform manual change-over; that is, the speed is changed automatically. Consequently, it becomes possible to constitute a rotary electric tool superior in utility.

What is claimed is:

1. A variable speed gearing in a rotary electric tool, comprising a differential gear mechanism mounted within a gear case, said gear case being fixed to a housing, a gear and a clutch means for attaining the same rotating direction of both inner and outer output shafts of the differential gear mechanism, disposed to attain said same rotating direction, a change-over means for changing over the rotation of said output shafts between synchronous rotation and independent rotation according to a variation in load wherein the variation in load causes the load to pass a present torque value.

2. A variable speed gearing according to claim 1, wherein said differential gear mechanism comprises a multi-stage planetary gear mechanism including a first planetary gear mechanism a second planetary gear mechanism, and a third planetary gear mechanism.

3. A variable speed gearing according to claim 2, wherein said clutch mechanism is disposed inside an internal gear of said second planetary gear mechanism to intermit rotation with respect to said third planetary gear mechanism.

4. A variable speed gearing according to claim 2, wherein projections are formed on an outer peripheral surface of an internal gear of the third planetary gear mechanism at substantially equal intervals in a circumferential direction, and a torque setting cam having projections for engagement with and disengagement from the projections of said internal gear in the third planetary gear mechanism fitted in a front portion of the gear case.

5. A variable speed gearing according to claim 2, comprising a change-over disk adapted to be engaged with and disengaged from both the gear case and an internal gear of the first planetary gear mechanism.

6. A variable speed gearing according to claim 5, comprising a cam for engaging and disengaging said change-over disk according to a variation of load exerted on the terminal output portion.

7. A variable speed gearing according to claim 1, wherein said gear and said clutch means are disposed on at least one output side of said differential gear.

* * * * *

UNITED STATES PATENT AND TRADEMARK OFFICE
CERTIFICATE OF CORRECTION

PATENT NO. : 4,869,131

DATED : September 26, 1989

INVENTOR(S) : T. OHMORI

Page 1 of 2

It is certified that error appears in the above-identified patent and that said Letters Patent is hereby corrected as shown below:

in the Abstract, please use the following Abstract instead of the one in the printed patent:

---ABSTRACT OF THE DISCLOSURE

A variable speed gearing including a differential gear mechanism mounted within a gear case fixed to a housing, an intermediate gear and a clutch mechanism for attaining the same rotating direction of both inner and outer shafts of the differential gear mechanism disposed, preferably on at least one output side, to attain the same rotating direction, and a changeover device for changing over the rotation of the output shafts between synchronous rotation and independent rotation according to a variation in load.---;

Column 1, line 57, change ":" to ---;---.

Column 1, line 59, change "and a" to ---and (iii) a---.

Column 2, line 33, delete "a".

Figure 3:
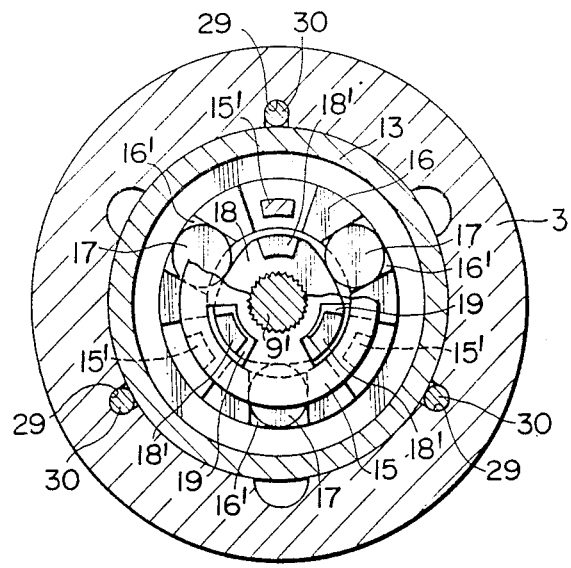
FIG. 3 is a sectional view taken along line (3)—(3) of FIG. 1.
Figure 4:
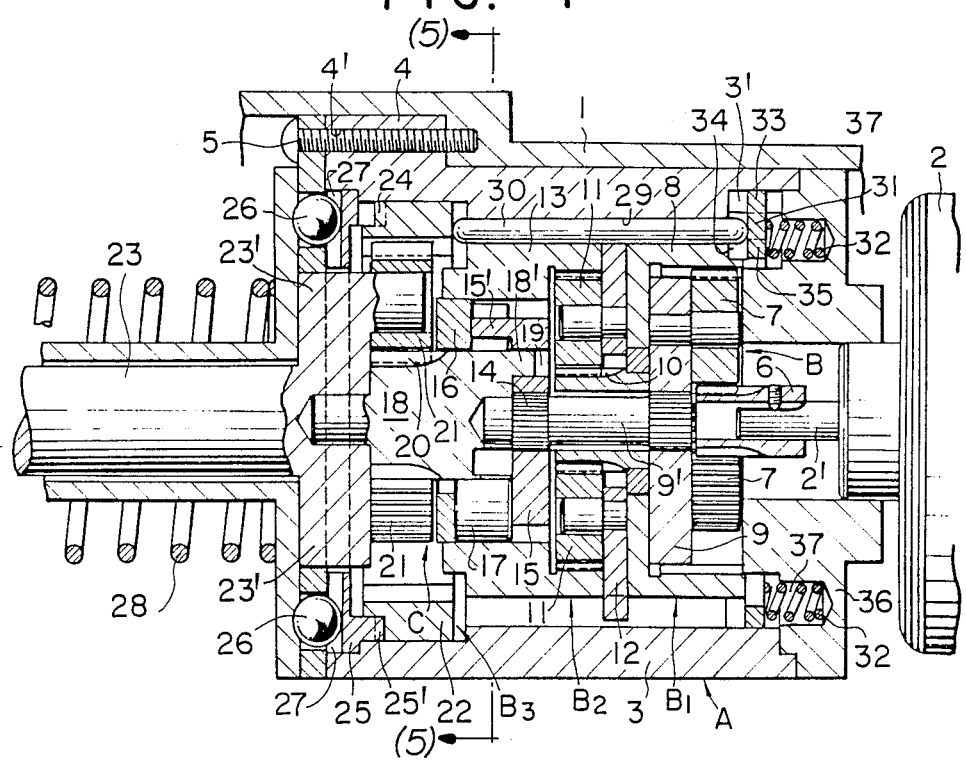
FIG. 4 is a sectional view of the variable speed gearing which is in a changed-over condition to low speed rotation.
Figure 5:
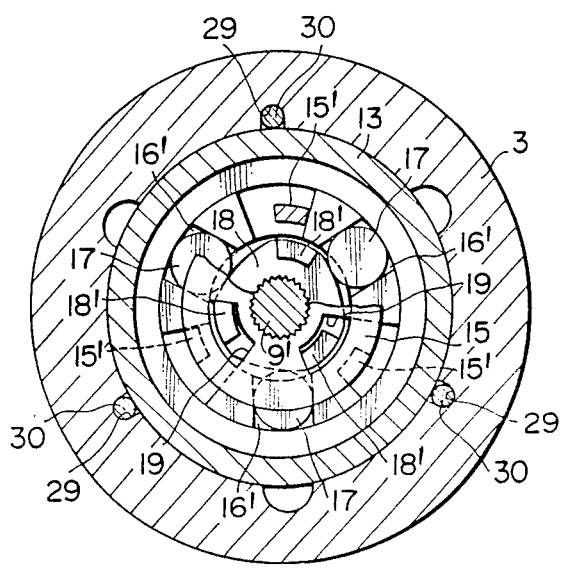
FIG. 5 is a sectional view taken along line (5)—(5) of FIG. 4.

Column 3, line 2, change "FIG. 18" to ---FIG. 3---.

Column 3, line 5, change "shaft" to ---cam---.

Column 3, line 5, change "groves" to ---grooves---; and

UNITED STATES PATENT AND TRADEMARK OFFICE
CERTIFICATE OF CORRECTION

PATENT NO. : 4,869,131

DATED : September 26, 1989

INVENTOR(S) : T. Ohmori

It is certified that error appears in the above-identified patent and that said Letters Patent is hereby corrected as shown below:

Column 4, line 52, change "13" to --11--.

Signed and Sealed this

Eighth Day of October, 1991

*Attest:*

HARRY F. MANBECK, JR.

*Attesting Officer*  *Commissioner of Patents and Trademarks*